(12) United States Patent
Leng et al.

(10) Patent No.: US 12,508,955 B2
(45) Date of Patent: Dec. 30, 2025

(54) LONGITUDINALLY AND TRANSVERSELY SLIDABLE VEHICLE SEAT

(71) Applicant: Bayerische Motoren Werke Aktiengesellschaft, Munich (DE)

(72) Inventors: Michael Leng, Geltendorf (DE); Dieter Strasser, Oberhausen (DE); Bernhard Weiler, Munich (DE); Hagen Wlk, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 397 days.

(21) Appl. No.: 18/027,766

(22) PCT Filed: Sep. 3, 2021

(86) PCT No.: PCT/EP2021/074335
§ 371 (c)(1),
(2) Date: Mar. 22, 2023

(87) PCT Pub. No.: WO2022/069150
PCT Pub. Date: Apr. 7, 2022

(65) Prior Publication Data
US 2023/0339370 A1     Oct. 26, 2023

(30) Foreign Application Priority Data
Oct. 1, 2020  (DE) .................... 10 2020 125 710.4

(51) Int. Cl.
  *B60N 2/06*   (2006.01)
  *B60N 2/02*   (2006.01)
  *B60N 2/07*   (2006.01)
(52) U.S. Cl.
  CPC ........... *B60N 2/062* (2013.01); *B60N 2/0742* (2013.01); *B60N 2/02246* (2023.08)

(58) Field of Classification Search
  CPC .... B60N 2/14; B60N 2/02246; B60N 2/0742; B60N 2/062
  See application file for complete search history.

(56) References Cited

U.S. PATENT DOCUMENTS

| | | | |
|---|---|---|---|
| 2,821,240 A * | 1/1958 | Morrill, Jr. | ............ B60N 2/062 5/8 |
| 4,184,656 A | 1/1980 | Wakeley | |

(Continued)

FOREIGN PATENT DOCUMENTS

| | | |
|---|---|---|
| DE | 201 02 091 U1 | 8/2002 |
| DE | 10 2006 002 732 A1 | 8/2007 |

(Continued)

OTHER PUBLICATIONS

International Search Report (PCT/ISA/210) issued in PCT Application No. PCT/EP2021/074335 dated Jan. 12, 2022 with English translation (four (4) pages).

(Continued)

*Primary Examiner* — Milton Nelson, Jr.
(74) *Attorney, Agent, or Firm* — Crowell & Moring LLP

(57) ABSTRACT

A longitudinally and transversely slidable vehicle seat has a seat mounting with a mounting part fixed on the vehicle and a slidable mounting part. An adjusting device slides the vehicle seat in the longitudinal vehicle direction and in the transverse vehicle direction. The adjusting device has a first guide section extending with a direction component in the longitudinal vehicle direction and a second guide section extending with a direction component in the transverse vehicle direction. The seat mounting is provided with a coupling device, which couples the slidable mounting part and the fixed mounting part to each other. The first guide section and the second guide section lie in a common plane. The guide sections are formed on or in a slotted guide. The slotted guide has a slotted guide track formed as a slot or (Continued)

groove. The adjusting device has a slotted guide element provided so that it can be guided along the course of the slotted guide. The slotted guide has a first outer edge region with a first guide track and a second outer edge region with a second guide track which lies opposite the first guide track. The two guide tracks extend partially in parallel to one another and to the slotted guide track lying there between and each form at least one of the guide sections.

11 Claims, 2 Drawing Sheets

(56) References Cited

U.S. PATENT DOCUMENTS

| 10,046,675 | B1 | 8/2018 | Whitens et al. |
| 10,059,231 | B2 * | 8/2018 | Reuschel ............. B60N 2/0745 |
| 2009/0230712 | A1 | 9/2009 | Maier et al. |
| 2018/0354391 | A1 | 12/2018 | Guy et al. |
| 2020/0171983 | A1 | 6/2020 | Dry et al. |
| 2022/0234476 | A1 * | 7/2022 | Danna ..................... B60N 2/06 |

FOREIGN PATENT DOCUMENTS

| DE | 10 2008 004 231 A1 | 7/2009 | |
| DE | 10 2018 110 414 A1 | 11/2018 | |
| DE | 102021100625 B3 * | 3/2022 | ............. B60N 2/062 |
| WO | WO 00/41911 A1 | 7/2000 | |

OTHER PUBLICATIONS

German-language Written Opinion (PCT/ISA/237) issued in PCT Application No. PCT/EP2021/074335 dated Jan. 12, 2022 (five (5) pages).

German-language Search Report issued in German Application No. 10 2020 125 710.4 dated May 6, 2021 with partial English translation (11 pages).

* cited by examiner

LONGITUDINALLY AND TRANSVERSELY SLIDABLE VEHICLE SEAT

BACKGROUND AND SUMMARY

The invention relates to a longitudinally and transversely slidable vehicle seat, with a seat mounting having a vehicle-fixed mounting part and a slidable mounting part, and with an adjustment device for sliding the vehicle seat in the longitudinal vehicle direction and in the transverse vehicle direction. It furthermore relates to vehicle, in particular a motor vehicle, with at least one such vehicle seat.

In conventional vehicles, a vehicle seat in the second seat row of a car can only be adjusted over a small adjustment travel in the longitudinal vehicle direction, since the space behind the second seat row usually serving as a luggage compartment is restricted by the rear wheelarches. In particular if the vehicle seat is configured as a reclining seat, sliding the vehicle seat of the second seat row over a greater longitudinal adjustment travel into the area of the luggage compartment is not possible with current longitudinal adjustment systems. This is because it is not possible, by only sliding in the longitudinal vehicle direction, to bypass the rear wheelarches.

DE 10 2006 022 732 A1 and DE 10 2008 004 231 A1 each disclose a seat arrangement for a motor vehicle in which the vehicle seat can be moved along a slotted guide track in the longitudinal vehicle direction and in the transverse vehicle direction. Thus, when moved in the longitudinal direction, the vehicle seat is automatically also moved in the transverse direction. At least one guide peg on the seat engages in a guide groove on the vehicle structure and is moved therein. The vehicle seat is guided in longitudinal rails which are in turn guided in transverse rails. The vehicle seat can be locked at predetermined locking intervals in both the longitudinal and transverse directions, and released from the locked position, by means of an actuator. The rails arranged above one another take up a high installation space.

US 2018/0354391 A1 discloses a vehicle seat system in which the vehicle seats are movable in both the longitudinal vehicle direction and in the transverse vehicle direction, in a rail track provided in the interior floor of the vehicle.

DE 10 2018 110 414 A1 describes a vehicle seat which is suspended on a vertical seat support which itself can be moved in a cruciform rail track in the interior floor of the vehicle, so that the vehicle seat rotates.

The object of the present invention is to provide an improved vehicle seat which is longitudinally and transversely slidable.

This object is achieved with the features of the independent claims.

A longitudinally and transversely slidable vehicle seat, with a seat mounting having a vehicle-fixed mounting part and a slidable mounting part, and with an adjustment device for sliding the vehicle seat in the longitudinal vehicle direction and in the transverse vehicle direction, is provided. The adjustment device has at least one first guide portion extending with a direction component in the longitudinal vehicle direction, and at least one second guide portion extending with a direction component in the transverse vehicle direction. The seat mounting is provided with a coupling device which is designed to couple the slidable mounting part and the vehicle-fixed mounting part together. The at least one first guide portion and the at least one second guide portion lie in a common plane, wherein the guide portions are formed on or in a sliding block guide. The sliding block guide has a slotted guide track formed as a slot or groove. The adjustment device has at least one sliding block guide element (e.g. a sliding block) which is provided so as to be guidable along the course of the sliding block guide. The sliding block guide has a first outer edge region with a first guide track and a second outer edge region with a second guide track which lies opposite the first guide track, wherein the two guide tracks extend partially parallel to one another and to the slotted guide track lying in-between, and each form at least one of the guide portions.

The provision of guide tracks, parallel to one another and to the slotted guide track on the outer edge region of the sliding block guide, not only guides the seat locally in the slotted guide track but also on the guide tracks, so that during sliding, the seat retains a defined orientation.

The guide tracks on the outer edge region of the sliding block guide here perform the function of the seat rails. The course of the sliding block guide with at least one direction component in the transverse direction includes an abrupt transfer out of the longitudinal guide into the transverse guide at a right angle to the longitudinal adjustment direction, although a gradual transition from the longitudinal guide to the transverse guide is preferred since the transverse force pulses acting on a passenger seated in the vehicle seat are then lower. It is thus advantageous if the transverse movement of the vehicle seat is always accompanied by a continued longitudinal movement.

According to the invention, the sliding block guide device comprises not only the slotted guide track which guides the vehicle seat along the course of the sliding block guide, but also the rail-like guidance of the seat with a defined orientation of the seat about its vertical axis, without additional seat rails being required. Thus, installation space and height are saved. Also, the vehicle seat according to the invention has a coupling device which can couple the slidable mounting part and the fixed mounting part together, and serves for locking the vehicle seat.

The locking, which in the prior art is provided for both the longitudinal adjustment direction and for the transverse adjustment direction and must usually be provided on one of the transverse rails and one of the longitudinal rails, is according to the invention integrated in the sliding block guide, whereby only one locking device need be provided, which lowers costs. The slotted guide track or guide track may here be provided with coupling portions. In this way, the guide function and locking function are both implemented in the sliding block guide device, but there they are still physically separated from one another.

Further preferred and advantageous design features of the vehicle seat according to the invention are the subject of the dependent claims.

Preferably, the adjustment device has at least one first guide element assigned to the first guide track and cooperating therewith, and at least one second guide element assigned to the second guide track and cooperating therewith.

It is advantageous if the first guide element and the second guide element are spaced apart from one another, such that they always lie simultaneously against their respective assigned guide tracks.

Preferably, the sliding block guide is L-shaped, wherein a first track portion of the first guide track, a first track portion of the second guide track and a first slotted guide track portion are formed in or on a first leg of the sliding block guide extending substantially parallel to the longitudinal vehicle direction, and wherein a second track portion of the first guide track, a second track portion of the second guide track and a second slotted guide track portion are formed in or on a second leg of the sliding block guide extending substantially parallel to the transverse vehicle direction.

In a preferred refinement of the invention, the coupling device has at least one coupling portion provided in or on the sliding block guide, and a coupling element, wherein the coupling device is configured such that the coupling element can be brought into engagement with the coupling portion for the purpose of coupling.

In a further preferred refinement of the invention which may be combined with other embodiments, the coupling device is part of an electric drive for the adjustment device.

Here, the at least one coupling portion may be configured as a friction surface track, and the coupling element as a friction wheel which can be brought into engagement therewith.

Preferably however, the at least one coupling portion is configured as a toothed rod device and the coupling element as a cog which can be brought into engagement therewith.

Both the friction wheel solution and the toothed rod solution firstly allow a secure locking of the vehicle seat and secondly are suitable for applying drive forces from an electric motor drive, which drives the friction wheel or cog as a drive wheel, of the friction wheel or cog to the sliding block guide, and thus moving the vehicle seat by motor power.

A particularly advantageous embodiment of the vehicle seat according to the invention is distinguished in that a first coupling portion, which is formed by a first toothed rod of the toothed rod device and runs in the longitudinal vehicle direction, and a second coupling portion, which is formed by a second toothed rod of the toothed rod device and runs with at least a direction component in the transverse vehicle direction, are formed on two mutually abutting sides of the slotted guide track. The drive for the cog intermeshing with the toothed rod of the toothed rod device is preferably controlled such that a soft stop is inserted before a change of the slide direction of the seat. This means that the slide movement is slowly braked in a first direction before the slide occurs in the second slide direction. This avoids sudden accelerations, which a person sitting on the vehicle seat would perceive as unpleasant, on a change of slide direction.

The invention is also directed to a vehicle, in particular a motor vehicle, with at least one vehicle seat configured according to the invention.

Preferred exemplary embodiments of the invention with additional design details and further advantages are described in more detail and explained below with reference to the appended drawings.

DETAILED DESCRIPTION OF THE DRAWINGS

Figure 1:
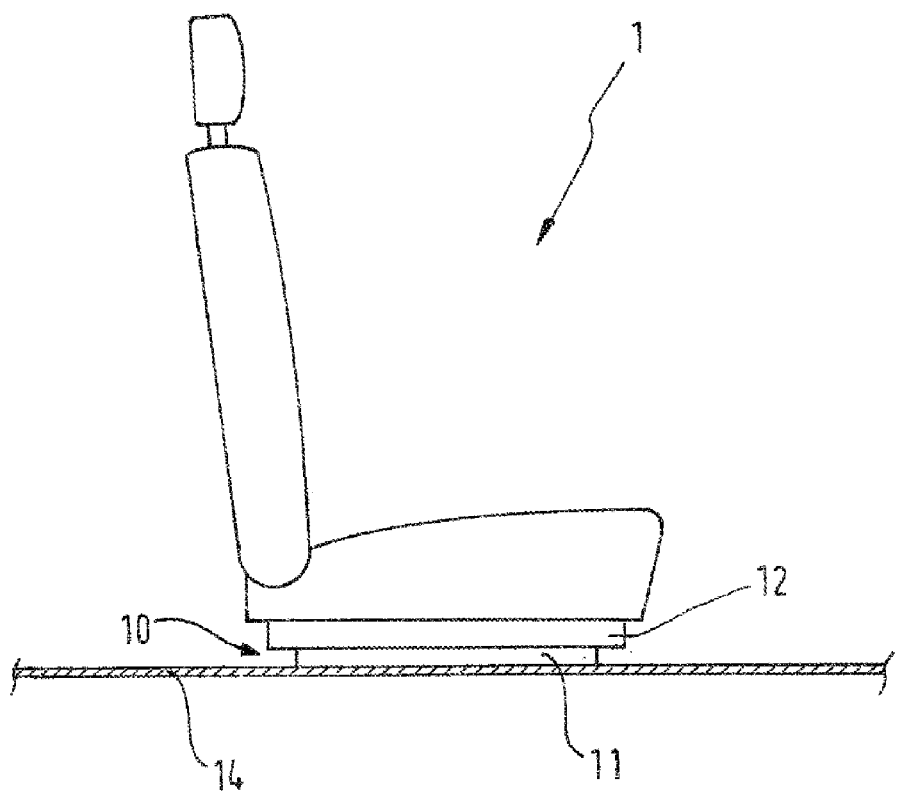
FIG. 1 shows a vehicle seat according to an embodiment of the invention.
Figure 2:
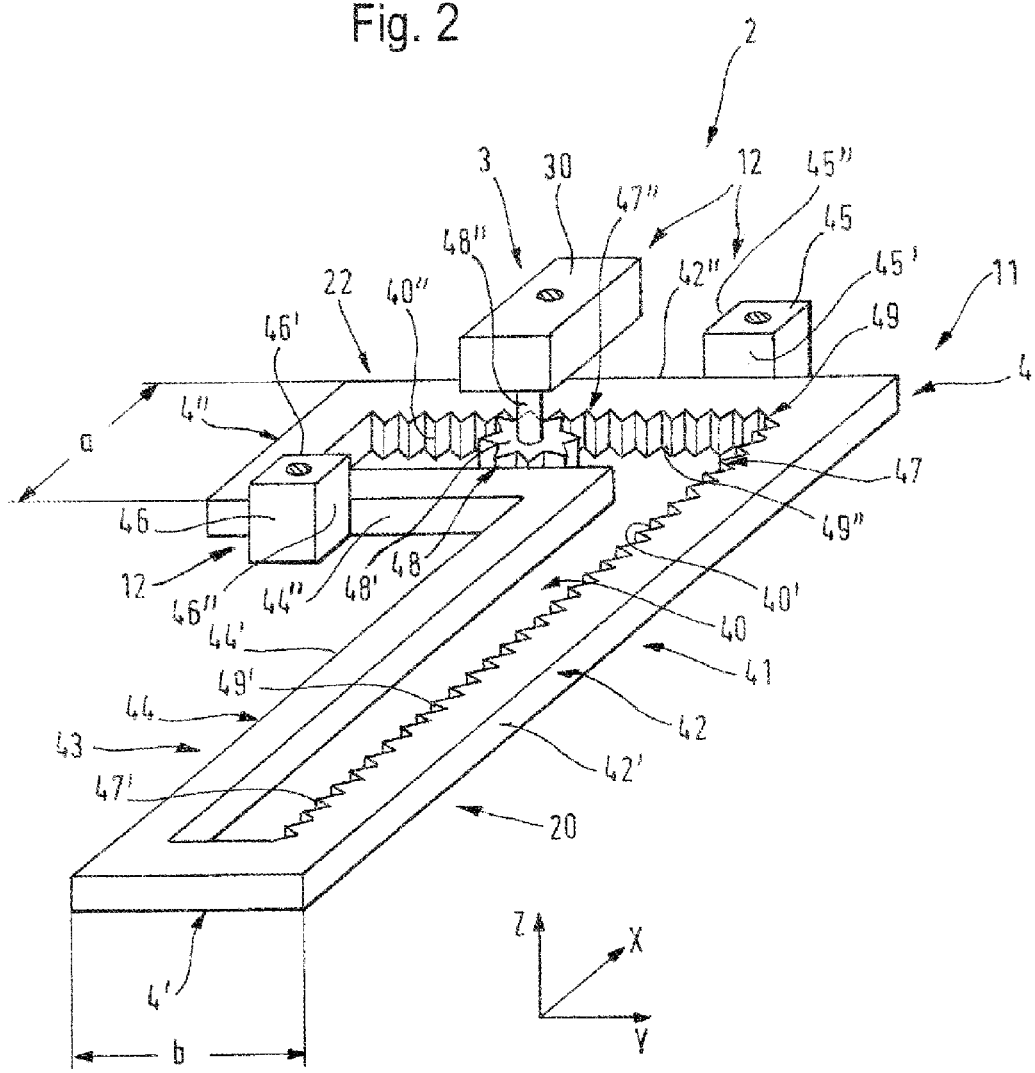
FIG. 2 shows an exemplary embodiment of a sliding block guide of the vehicle seat of FIG. 1.

FIG. 1 shows, in a side view, a vehicle seat 1 which is arranged by means of a seat mounting 10 on the interior floor 14 of a vehicle which is not otherwise shown in detail. The seat mounting 10 has a vehicle-fixed mounting part 11 connected to the interior floor 14, and a slidable mounting part 12 connected to the vehicle seat 1. The two mounting parts 11, 12 are movable relative to one another and guided on one another by means of an adjustment device 2, as described below with reference to FIG. 2.

In the example shown, the adjustment device 2 has a sliding block guide 4 which is connected to the fixed mounting part 11 and is here L-shaped, having a first leg 4' extending substantially parallel to the longitudinal vehicle direction X and a second leg 4" extending substantially parallel to the transverse vehicle direction Y. The L-shaped form of the sliding block guide 4 is here shown merely as an example; the sliding block guide may also have any other shape with a first leg which extends with a predominant direction component in the longitudinal vehicle direction, and with a second leg which extends with a predominant direction component in the transverse vehicle direction.

The sliding block guide 4 has a slotted guide track 40 formed as a slot or groove, with a first slotted guide track portion 40' running parallel to the longitudinal vehicle direction X, and with a second slotted guide track portion 40" running parallel to the transverse vehicle direction Y. The two slotted guide track portions 40', 40" may also deviate slightly, for example by a few angular degrees, from a parallelism to the longitudinal vehicle direction X or transverse vehicle direction Y.

The two legs 4', 4" of the sliding block guide 4, on their outer long sides facing away from one another, each form a first outer edge region 41 and a second outer edge region 43. At the first outer edge region 41, a first guide track 42 is provided for a first guide element 45 cooperating therewith, and at the second outer edge region 43, a second guide track 44 is provided for a second guide element 46 cooperating therewith. The two guide tracks 42, 44 run partially parallel to one another and parallel to the slotted guide track 40 located in-between, wherein the guide tracks 42, 44 lie opposite one another relative to the slotted guide track 40.

The guide tracks 42, 44 each form a guide portion 20, 22 of the adjustment device 2 and serve for guiding the vehicle seat 1 on sliding of the slidable mounting part 12 of the vehicle seat 1. The first guide portion 20 is here formed by a first track portion 42' of the first guide track 42 running parallel to the longitudinal vehicle direction X, and a first track portion 44' of the second guide track 44, and the second guide portion 22, running parallel to the transverse vehicle direction Y, is formed by a second track portion 42" of the first guide track 42 and a second track portion 44" of the second guide track 44. Similarly, the slotted guide track 40 forms a first slotted guide track portion 40' running in the longitudinal vehicle direction X, and a second slotted guide track portion 40" running in the transverse vehicle direction Y.

The first guide element 45 and the second guide element 46 are connected to the slidable mounting part 12. These two guide elements 45, 46 are spaced apart from one another, both in the longitudinal vehicle direction X and also in the transverse vehicle direction Y, so far that they always lie against their respective assigned guide track 42 or 44. In other words, the distance between the sides 45', 46', facing one another in the longitudinal vehicle direction X, of the respective guide elements 45, 46 corresponds to the width a, measured in the longitudinal vehicle direction X, of the second leg 4" of the sliding block guide 4, and the distance of the sides 45", 46", facing one another in the transverse vehicle direction Y, of the respective guide elements 45, 46 corresponds to the width b, measured in the transverse vehicle direction Y, of the first leg 4' of the sliding block guide 4.

The seat mounting 10 is furthermore provided with a coupling unit 3 which is designed to couple the slidable mounting part 12 and the fixed mounting part 11 together. The coupling device 4 has a coupling element 48 connected to the slidable mounting part 12, and a coupling region 47 provided on the sliding block guide 4, wherein the coupling element 48 can be brought into engagement with the coupling region 47 for the purpose of coupling. For this, the coupling region 47 of the sliding block guide 4 is configured as a toothed rod device 49, which has, as a first coupling portion 47', a first toothed rod 49' which runs in the longitudinal vehicle direction X and is provided on the longer inside of the first slotted guide track portion 40', and, as a second coupling portion 47", a second toothed rod 49" which runs in the transverse vehicle direction Y and runs on the longer inside of the second slotted guide track portion 40' of the slotted guide track 40. The first toothed rod 49' formed on the first coupling portion 47', and the second toothed rod 49" provided on the second coupling portion 47", thus abut one another and between them form an internal angle of 90° in the example shown.

The coupling element 48 is configured as a cog 48' which can be brought into engagement with the toothed rods 49', 49" of the toothed rod device 49. The cog 48' is connected via a cog shaft 48" to an electric drive 30 for the adjustment device 2, so that the cog 48' can be set in rotation by the electric drive 30. Depending on rotation direction, the cog 48' then rolls on the toothed rods 49', 49" of the toothed rod device 49 in the one or the other direction. The teeth of the toothed rods 49', 49" are arranged such that the cog 48' can roll smoothly from the one toothed rod into the other toothed rod at the site at which the two toothed rods 49', 49" meet.

When the cog 48' rolls along the toothed rods 49', 49" of the toothed rod device 49, it carries with it, via the toothed rod shaft 48", the drive 30 which is connected to the slidable mounting part 12 and hence to the vehicle seat 1, so that the vehicle seat is moved along the vehicle-fixed sliding block guide 4 in the transverse vehicle direction Y or longitudinal vehicle direction X.

The invention is not restricted to the above exemplary embodiment which serves purely for general explanation of the core concept of the invention. The device according to the invention may rather assume embodiments other than those described above within the scope of protection. The device may here in particular have features which constitute a combination of the respective individual features of the claims.

Reference signs in the claims, description and drawings serve purely for better understanding of the invention and do not restrict the scope of protection.

LIST OF REFERENCE SIGNS

1 Vehicle seat
2 Adjustment device
3 Coupling device
4 Sliding block guide
4' Leg
4" Leg
10 Seat mounting
11 Mounting part
12 Mounting part
20 Guide portion
22 Guide portion
30 Electric drive
40 Slotted guide track
40" Slotted guide track portion
41 Outer edge region
42 Guide track
43 Outer edge region
44 Guide track
45 Guide element
45' Facing side
45" Facing side
46 Guide element
46' Facing side
46" Facing side
47 Coupling region
47' First coupling portion
47" Second coupling portion
48 Coupling element
48' Cog
48" Cog shaft
49 Toothed rod device
49' Toothed rod
49" Toothed rod
X Longitudinal vehicle direction
Y Transverse vehicle direction
a Width
b Width

The invention claimed is:

1. A longitudinally and transversely slidable vehicle seat, comprising:
a seat mounting having a vehicle-fixed mounting part and a slidable mounting part; and
an adjustment device for sliding the vehicle seat in a longitudinal vehicle direction and in a transverse vehicle direction, wherein
the adjustment device comprises a sliding block guide having a first guide portion extending with a direction component in the longitudinal vehicle direction, and a second guide portion extending with a direction component in the transverse vehicle direction,
the seat mounting has a coupling device which couples the slidable mounting part and the vehicle-fixed mounting part together,
the first guide portion and the second guide portion lie in a common plane and are formed on or in the sliding block guide,
the sliding block guide has a slotted guide track formed as a slot or groove,
the adjustment device further comprises at least one sliding block guide element provided so as to be guidable along a course of the sliding block guide,
the sliding block guide has a first outer edge region with a first guide track, and a second outer edge region with a second guide track which lies opposite the first guide track, and
the first and second guide tracks extend partially parallel to one another and to the slotted guide track lying in-between, and each form at least one of the first and second guide portions.

2. The vehicle seat according to claim 1, wherein
the sliding block guide element has at least one first guide element assigned to the first guide track and cooperating therewith, and at least one second guide element assigned to the second guide track and cooperating therewith.

3. The vehicle seat according to claim 2, wherein
the first guide element and the second guide element are spaced apart from one another so as to always lie simultaneously against their respective assigned first and second guide tracks.

4. The vehicle seat according to claim 3, wherein
the sliding block guide is L-shaped,
a first track portion of the first guide track, a first track portion of the second guide track and a first slotted guide track portion are formed in or on a first leg of the sliding block guide extending substantially parallel to the longitudinal vehicle direction, and a second track portion of the first guide track, a second track portion of the second guide track and a second slotted guide track portion are formed in or on a second leg of the sliding block guide extending substantially parallel to the transverse vehicle direction.

5. The vehicle seat according to claim 1, wherein
the coupling device has at least one coupling portion provided in or on the sliding block guide, and a coupling element, and
the coupling device is configured such that the coupling element is brought into engagement with the coupling portion for purpose of coupling.

6. The vehicle seat according to claim 1, wherein
the coupling device is part of an electric drive for the adjustment device.

7. The vehicle seat according to claim 6, wherein
the at least one coupling portion is configured as a friction surface track, and the coupling element as a friction wheel which is brought into engagement therewith.

8. The vehicle seat according to claim 6, wherein
the at least one coupling portion is configured as a toothed rod device, and the coupling element as a cog which is brought into engagement therewith.

9. The vehicle seat according to claim 1, wherein
the at least one coupling portion is configured as a toothed rod device, and the coupling element as a cog which is brought into engagement therewith.

10. The vehicle seat according to claim 9, wherein
a first coupling portion which is formed by a first toothed rod of the toothed rod device and runs in the longitudinal vehicle direction, a second coupling portion which is formed by a second toothed rod of the toothed rod device and runs in the transverse vehicle direction, are formed on two mutually abutting sides of the slotted guide track.

11. A vehicle, comprising:
a vehicle interior floor; and
a vehicle seat according to claim 1,
wherein the vehicle seat is mounted on the vehicle interior floor via the vehicle-fixed mounting part.

\* \* \* \* \*